Nov. 11, 1924.
W. R. McGOWEN
1,515,307
AUTOMOBILE SIDE BUMPER
Filed July 2, 1924
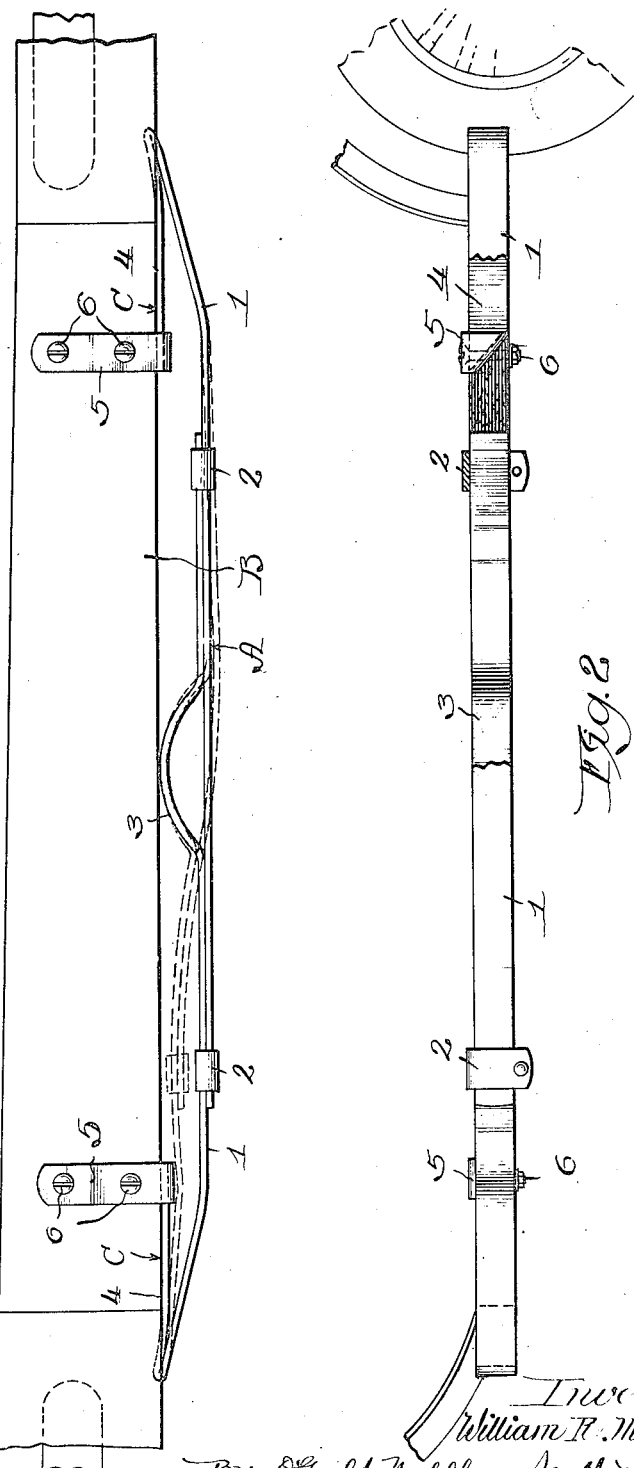

Patented Nov. 11, 1924.

1,515,307

UNITED STATES PATENT OFFICE.

WILLIAM R. McGOWEN, OF PITTSBURGH, PENNSYLVANIA.

AUTOMOBILE SIDE BUMPER.

Application filed July 2, 1924. Serial No. 723,637.

*To all whom it may concern:*

Be it known that I, WILLIAM R. McGOWEN, a citizen of the United States of America, and a resident of Pittsburgh, Pennsylvania, have invented a certain new and useful Improvement in Automobile Side Bumpers, of which the following is a specification.

This invention relates to improvements in side bumpers designed to be mounted along the running boards of motor vehicles to afford protection against side collision and blows. A bumper of this type was the subject matter of a prior application filed by me on November 9, 1923, bearing Serial No. 673,639.

The object of the present invention is to provide an improved construction for side bumpers with a view to simplifying the structure and giving added strength with decreased cost of manufacture.

The bumper embodying the novel features of construction embodying the invention is disclosed in the accompanying drawing in which—

Figure 1 is a top plan view of the bumper attached to the vehicle running board, and Figure 2 is a view in side elevation of the bumper.

The bumper is fabricated from flat bars of spring steel, shaped to form an impact member A spaced outwardly from the edge of the running board B, and inwardly bent portions C, C, engaging flatwise against said edge and including integral end straps hereinafter to be described.

The bumper consists of two complementary bars 1, 1, each forming one-half of the complete structure. Each of these bars is shaped to form straight portions which overlap throughout the central portion of the impact member and clamped together by clamps 2, 2. One of the bars is provided with a rounded offset portion 3 as will hereinafter be explained more in detail.

The end portions of these bars, 1, 1, are inclined rearwardly toward the ends of the bumper, and bent inwardly at a sharp angle to form V-shaped ends and rearwardly disposed ends 4, 4, which lie flatwise against the edge of the running board. These ends also include attaching straps 5, 5, which are formed by bending or folding the bar over upon itself with the extremity at right angles and again bending it at right angles and rearwardly to extend transversely of the board in the plane of the upper edge of the bumper. Bolts 6 pass through the straps 5, 5, for attaching the bumper in place.

The overlapping portion of the bars 1, 1, form a central section of double thickness and in addition permit lengthwise adjustment whereby the bumper can be extended or contracted to fit different lengths of running board. It is manifest that side bumpers must be relatively narrow so that they will not project too far from the sides of the vehicles and thus be objectionable. For this reason the distortion of the impact member under shock is limited and hence, if unsupported except at the ends of the bumper, the central portion would readily be driven against the edge of the running board by a relatively light blow and thus afford little or no protection. To overcome this condition, an auxiliary member is provided intermediate the end of the bumper by shaping a portion of the rearmost overlapping portion of one of the bars 1, to form the rounded portion 3 before referred to. This rounded or convex portion is located midway between the ends of the impact member, the amount of offset or rearward projection from the impact member being equal to the width of the bumper itself, so that the rounded portion bears at a point against the edge of the running board.

This round portion serves not so much as an auxiliary spring as it does a central rolling fulcrum as will be apparent from the following:—As illustrated in dotted lines (Figure 1) the bumper is under distortion as the result of a blow received at a point to the left of the central rounded portion 3. Under these conditions the blow is resisted by one half of the impact member, that is, the portion between the adjacent end of the bumper and the central portion which yields toward the edge of the running board, with a rolling movement of the rounded portion along the edge of the board, accompanied by an outward and resisting distortion of the other or right half of the impact member. In this way the bumper is stiffened by reducing its length and at the same time provides for an equalization of the forces resisting the blow in such a way as to secure the maximum shock absorbing effect without causing a permanent distortion or set in the bars. Manifestly, the same action takes place where a blow is received on the opposite side of the central portion.

In case a blow is received directly at the center or within that portion of the bumper between the end of the rounded portion B, the same rolling equalizing action will follow, accompanied by a flattening of said rounded porton, this being compensated for by an endwise slippage of the free end of the bar 1 (in which said rounded portion is formed) within the clamps, thus allowing the necessary elongation to take place. Thus it will be seen that the rounded portion serves as a fulcrum as well as a compression spring, the two functions being present simultaneously, but in varying degrees, dependent on the nature of the blow to be resisted.

The advantages of the structure resides not only in the functional results herein described, but in a manufacturing advantage as well, in that the provision of the rounded portion does not require the use of an additional member or part in its construction, but forms an integral portion of one of the bars.

I claim:

1. A bumper comprising an impact member extending parallel with and spaced from a supporting member and consisting of bars overlapping throughout the central portion of said impact member and having end portions adapted to be attached to said supporting member, one of said bars having an offset portion extending toward and adapted for contact with said supporting member.

2. A bumper adapted to be attached to the running board of an automobile comprising an impact member extending parallel to the edge of said board and spaced therefrom and consisting of a resilient bar bent to form end portions extending rearwardly and inwardly to engage the edge of the board, and a rounded offset portion intermediate the ends of the impact member and having bearing engagement with the edge of said board.

3. A bumper adapted to be attached to the running board of an automobile comprising an impact member extending parallel to the edge of said board and spaced therefrom and consisting of resilient bars bent to form end portions at opposite ends of said impact member adapted to be secured in flatwise contact with the edge of said running board, one of said bars being shaped to provide a rounded portion extending rearwardly and terminating substantially in the plane of said end portions.

4. A bumper adapted to be attached to the running board of an automobile comprising an impact member extending parallel to the edge of said board and spaced therefrom and consisting of resilient bars bent to form end portions at opposite ends of said impact member and having straight portions overlapping throughout the central portion thereof; there being formed in the rearmost overlapping bar, a rounded portion adapted for bearing and rolling contact.

5. A bumper adapted to be attached to the running board of an automobile comprising flat bars of resilient steel extending throughout the central portion of the bumper and bent at their ends to form rearwardly disposed end portions bearing flatwise against the edge of said board, one of said bars having a rearwardly extended curved portion adapted for rolling contact with the edge of said board intermediate said end portions.

6. A bumper adapted to be attached to the running board of an automobile comprising flat bars of resilient steel clamped together throughout the central portion of the bumper and bent at their ends to form rearwardly disposed end portions bearing flatwise against the edge of said board, one of said bars having a rearwardly extended curved portion adapted to bear against the edge of said board intermediate said end portions.

Signed at Pittsburgh this 26th day of June, 1924.

WILLIAM R. McGOWEN.